US009446847B2

United States Patent
Richardson et al.

(10) Patent No.: US 9,446,847 B2
(45) Date of Patent: Sep. 20, 2016

(54) VERTICALLY MOUNTED DRY ICE COOLING COMPARTMENT APPLIED TO A GALLEY CART FOR TEMPERATURE GRADIENT REDUCTION

(71) Applicant: The Boeing Company, Chicago, IL (US)

(72) Inventors: Marcus K. Richardson, Bothell, WA (US); Tateh Wu, Bellevue, WA (US); Raymond H. Horstman, Snohomish, WA (US); James P. Schalla, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 524 days.

(21) Appl. No.: 13/872,958

(22) Filed: Apr. 29, 2013

(65) Prior Publication Data

US 2014/0318156 A1  Oct. 30, 2014

(51) Int. Cl.

| F25D 3/12 | (2006.01) |
|---|---|
| F25D 25/02 | (2006.01) |
| B64D 11/04 | (2006.01) |
| B62B 3/00 | (2006.01) |
| B64D 11/00 | (2006.01) |
| A47B 31/02 | (2006.01) |

(52) U.S. Cl.
CPC ............... *B64D 11/04* (2013.01); *B62B 3/005* (2013.01); *A47B 31/02* (2013.01); *B62B 2202/67* (2013.01); *B62B 2204/04* (2013.01); *B62B 2204/06* (2013.01); *B64D 11/0007* (2013.01)

(58) Field of Classification Search
CPC ............ F25D 3/12; F25D 3/125; F25D 3/06; F25D 3/122; B64D 11/04; B64D 11/0007; A47B 31/06; A47B 31/02; B62B 2202/67
USPC ....................................................... 62/388, 56
See application file for complete search history.

(56) References Cited

U.S. PATENT DOCUMENTS

| 1,832,473 A | * | 11/1931 | Payson et al. | ........................ 62/388 |
| 1,864,040 A | * | 6/1932 | Campbell | ........................ 62/388 |
| 1,887,693 A | * | 11/1932 | Martin, Jr. | ........................ 62/56 |

(Continued)

FOREIGN PATENT DOCUMENTS

| EP | 0080313 B1 | 2/1986 |
| EP | 0609962 A2 | 8/1994 |

(Continued)

*Primary Examiner* — Allen Flanigan
*Assistant Examiner* — Filip Zec
(74) *Attorney, Agent, or Firm* — Felix L. Fischer

(57) ABSTRACT

A case for a galley cart defines a cavity with at least two dividers positioned within the cavity, each having a first end edge and an opposing second end edge, with the dividers defining at least two chambers within the cavity. A door is movably attached to the case having a first position in which the cavity is accessible and a second position in which the cavity is substantially sealed. The door incorporates a housing having at least one cooling puck corresponding to at least a first one of the chambers and a second cooling puck corresponding to a second one of the chambers. At least one sealing member is coupled to the housing in the door and configured to compress against the first end edges of the dividers and to provide flow communication between the first cooling compartment and the first chamber and between the second cooling compartment and the second chamber when the door is in the second position.

20 Claims, 8 Drawing Sheets

(56) References Cited

U.S. PATENT DOCUMENTS

| | | | |
|---|---|---|---|
| 2,024,648 A * | 12/1935 | Kissling et al. | 62/388 |
| 3,222,114 A * | 12/1965 | Stentz | 312/403 |
| 3,866,435 A * | 2/1975 | Frank et al. | 62/382 |
| 4,019,793 A | 4/1977 | Gerding | |
| 4,206,616 A | 6/1980 | Frank et al. | |
| 4,397,159 A | 8/1983 | Dodd | |
| 4,741,167 A | 5/1988 | Wigley | |
| 4,898,294 A | 2/1990 | Jennings | |
| 6,269,651 B1 * | 8/2001 | Price | 62/255 |
| 6,295,830 B1 * | 10/2001 | Newman | 62/388 |
| 7,487,889 B2 * | 2/2009 | Owens | B01F 5/061 222/144.5 |
| 7,975,504 B2 * | 7/2011 | Whewell, Jr. | 62/388 |
| 8,474,274 B2 * | 7/2013 | Schalla et al. | 62/89 |
| 2002/0088244 A1 | 7/2002 | Jennings et al. | |
| 2006/0070814 A1 | 4/2006 | Hu | |
| 2009/0090734 A1 * | 4/2009 | Wittern, Jr. | F25D 17/065 221/1 |
| 2010/0170287 A1 * | 7/2010 | Boss | 62/441 |
| 2011/0277489 A1 | 11/2011 | Schalla et al. | |

FOREIGN PATENT DOCUMENTS

| | | |
|---|---|---|
| EP | 0717246 A1 | 6/1996 |
| EP | 1858367 B1 | 4/2010 |
| EP | 2386811 A2 | 11/2011 |

* cited by examiner

VERTICALLY MOUNTED DRY ICE COOLING COMPARTMENT APPLIED TO A GALLEY CART FOR TEMPERATURE GRADIENT REDUCTION

BACKGROUND INFORMATION

1. Field

Embodiments of the disclosure relate generally to the field of food service carts for airline in-flight food service and more particularly to a compartmented insulated door carrying distributed dry ice pucks with metering orifices introducing cooling flow through the door insulation for distributed cooling.

2. Background

Galley carts are used on an aircraft to store food and beverages that need to be refrigerated and/or frozen during the duration of a flight. Conventional galley carts depend on a powered heat exchanger know as a chiller to cool a housing cavity of the cart where the food products are stored. However, the heat exchanger adds weight, discharges heated gas to the environment surrounding the cart and consumes power that can be otherwise be used by the aircraft. Further, additional cabin cooling is needed to counteract the heated gas discharged from the heat exchanger. As such, at least some known galley carts use dry ice to cool the housing cavity. However, when the dry ice is placed within the cart, it cools locally and the cooling stratifies along the height of the cart. The dry ice placed within the cart cools locally and then the cooler gas settles to the bottom trays. When the cooler gas settles, the upper trays can be too warm (i.e. above 40° F.) and the lower trays are freezing (i.e. below 32° F.). To alleviate this problem, fans are added to the carts to circulate the cool gas within the cart cavity. However, the fan requires a power source. Alternatively, the dry ice can be placed in the top portion of the cart such that the upper trays are cooled locally by the dry ice and the upper and middle trays are cooled by the cool gas flowing past as it settles to the bottom trays. However, over time, the cooling further stratifies such that middle trays are warmer than upper trays and lower trays and/or the upper and middle trays are warmer than bottom trays. This problem can be addressed by fine tuning the amount of dry ice, but the amount can be difficult to determine because of the many factors impacting cooling during a flight and on the ground It is therefore desirable to provide a galley cart with distributed cooling which overcomes the limitations of current galley carts.

SUMMARY

Embodiments disclosed herein provide a case defining a cavity with at least two dividers positioned within the cavity, each having a first end edge and an opposing second end edge, with the dividers defining at least two chambers within the cavity. A door is movably attached to the case having a first position in which the cavity is accessible and a second position in which the cavity is substantially sealed. The door incorporates a housing having at least one cooling puck corresponding to at least a first one of the chambers and a second cooling puck corresponding to a second one of the chambers. At least one sealing member is coupled to the housing in the door and configured to compress against the first end edges of the dividers and to provide flow communication between the first cooling compartment and the first chamber and between the second cooling compartment and the second chamber when the door is in the second position.

The embodiments provide a method for cooling a galley cart through inserting cooling pucks selectively vertically distributed in a housing of a door in a cart. Dividers are engaged with insulating sealing members on the door and an opposite end of the cart to create cooling chambers within a cavity of the cart. Convective cooling is accomplished through the insulating sealing member, if porous, or through orifices in the sealing members to evenly cool the chambers in the cart.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide a storage container for food and beverages for use, in example embodiments, as a galley cart for airline in-flight service. The cart includes vertically arrayed cooling compartments within a door of the cart. The cooling compartments are each configured to contain at least one coolant puck. Each cooling compartment corresponds to particular tray(s) positioned within a body cavity of the cart to facilitate uniform cooling of the tray volumes (a volume defined by a lower surface of an upper tray, an upper surface of a lower tray, the walls of the cart, and the door) without use of an external power source. An insulating sealing member on the door compresses against the end edges of the trays to prevent the cold gas from one tray volume from sinking into a lower tray volume, which prevents stratification of the cooling within the body cavity. A second sealing member is coupled to a cart wall opposite the door and is configured to compress against the other end edges of the trays. As such, the tray volumes are sealed along both ends by the insulating sealing members. The insulating sealing members may be porous to allow convection through the member. A variable opening orifice may be defined through an inner surface of the door and/or insulating sealing member to provide flow communication between the cooling compartments and their associated tray volume(s). The orifices can be tuned to further facilitate uniform cooling of the tray volumes based on changes in the size/shape/volume of the dry ice and/or on the uniformity of cooling within the cavity body. If the sealing member on the door is not sufficiently porous, orifices can be defined through the sealing member to provide flow communication through the sealing member. Further, partitions can be positioned within the door between adjacent cooling compartments to prevent cold gas from stratifying within the door.

Figure 1A:
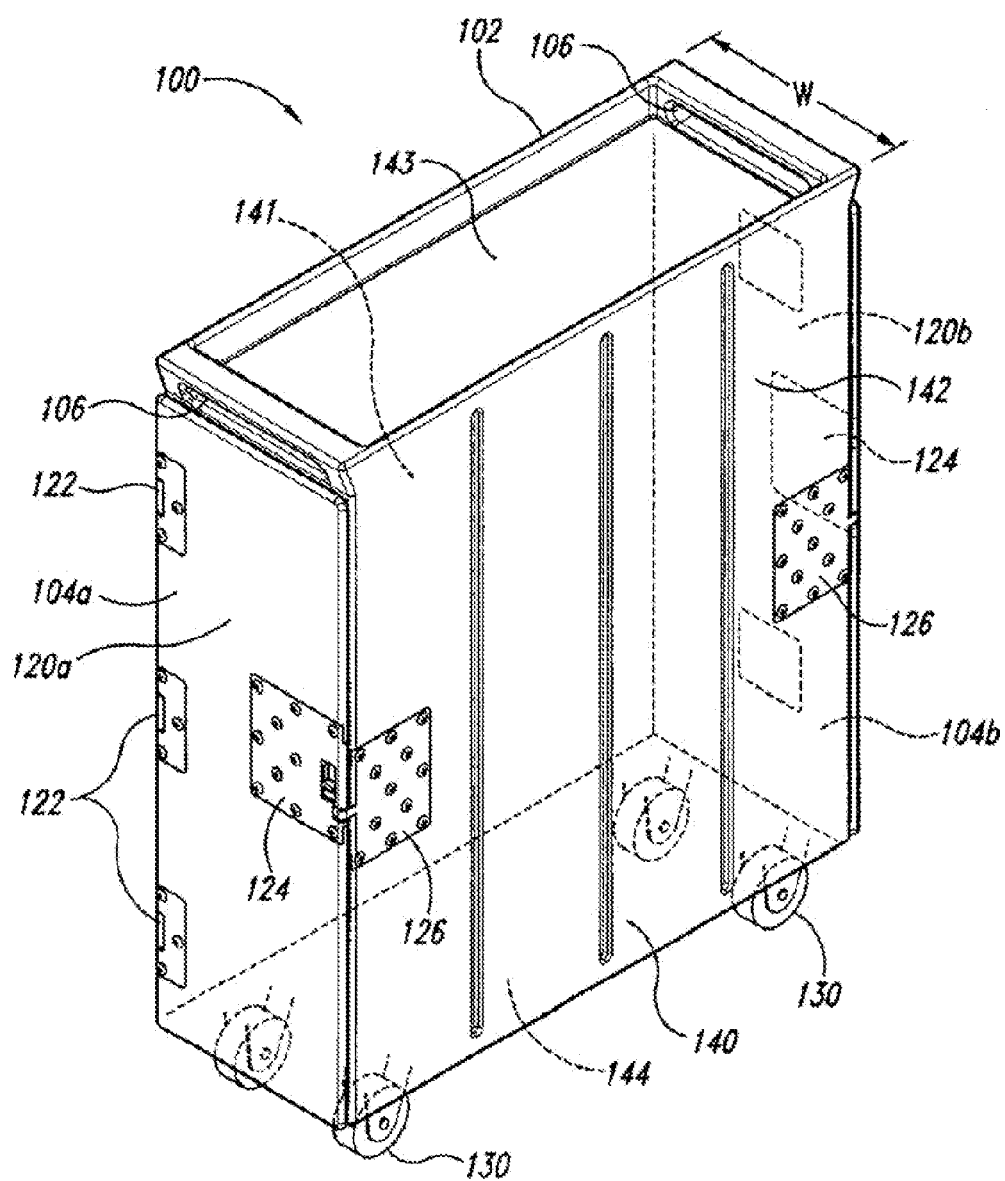
FIG. 1A is an external isometric view of a galley cart with which the present embodiments may be employed.
Figure 1B:
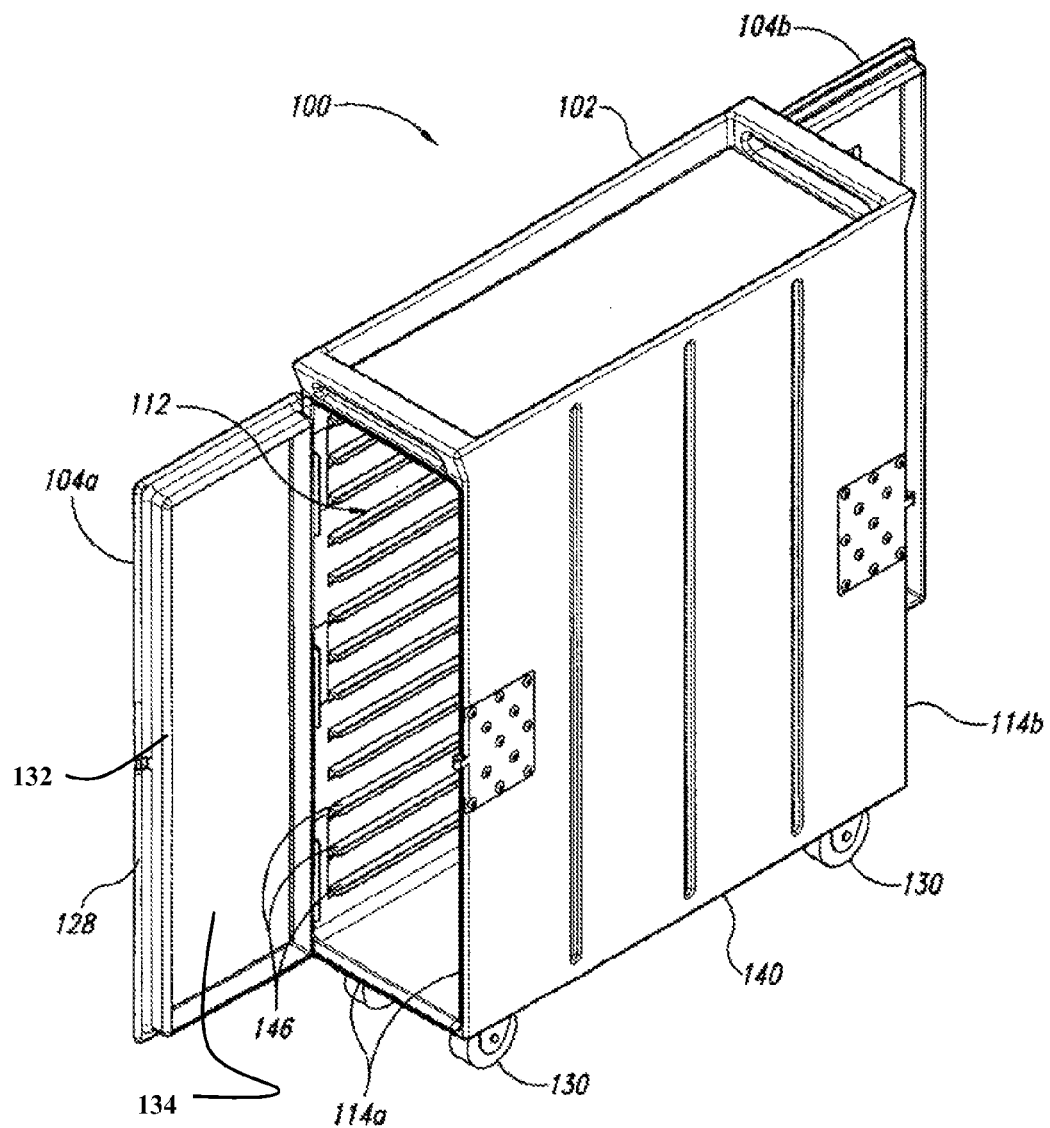
FIG. 1B is an isometric view of the galley cart of FIG. 1A with the doors open exposing the interior cavity of the housing of the cart.

Referring to the drawings, FIGS. 1A and 1B are isometric views of a galley cart 100 which may be employed in the embodiments disclosed herein. Referring to FIGS. 1A and 1B together, in one aspect of this embodiment, the galley cart 100 includes a case 102 having a case shell 140. In the illustrated embodiment, the case shell 140 forms a first side portion 141, a second side portion 142, a top portion 143, and a bottom portion 144 of the case 102. The galley cart 100 further includes a first door 104a positioned toward one end of the case 102, and, for certain embodiments, a second door 104b positioned toward an opposite end of the case 102. Each of the doors 104 can further include a plurality of hinges 122 and a latch 124. The hinges 122 pivotally attach the door shells 120 to the case shell 140. The latch 124 can be configured to releasably engage corresponding receivers 126 attached to the case shell 140 when the doors 104 are in closed positions as illustrated in FIG. 1A.

By disengaging the latch 124 from the corresponding receiver 126, the doors 104 can be opened outwardly providing access to an interior cavity 112 of the case 102 as illustrated in FIG. 1B. In a further aspect of this embodiment, the interior cavity 112 of the case 102 include a plurality of support rails 146 configured to support a plurality of food trays (not shown). Positioning the doors 104 at respective ends of the case 102 allows flight attendants to conveniently access food stored within the case 102 from either end of the galley cart 100. In other embodiments, the second door 104b can be omitted if desired. As further illustrated in FIG. 1B, each of the doors 104 can additionally include a compressible seal 128 configured to seal any gaps that may exist between the doors 104 and corresponding case apertures 114a-b when the doors 104 are closed. Additionally, the doors 104 include a rim 132 which forms a housing 134 (seen in FIG. 1B) to be described in greater detail subsequently. Wheels or casters 130 allow the galley cart to be easily maneuvered within the service areas and aisles of the aircraft. Handles 106, integral with the top portion 143 for the embodiment shown, are provided to be grasped by the flight attendants when maneuvering the galley cart.

Figure 2:
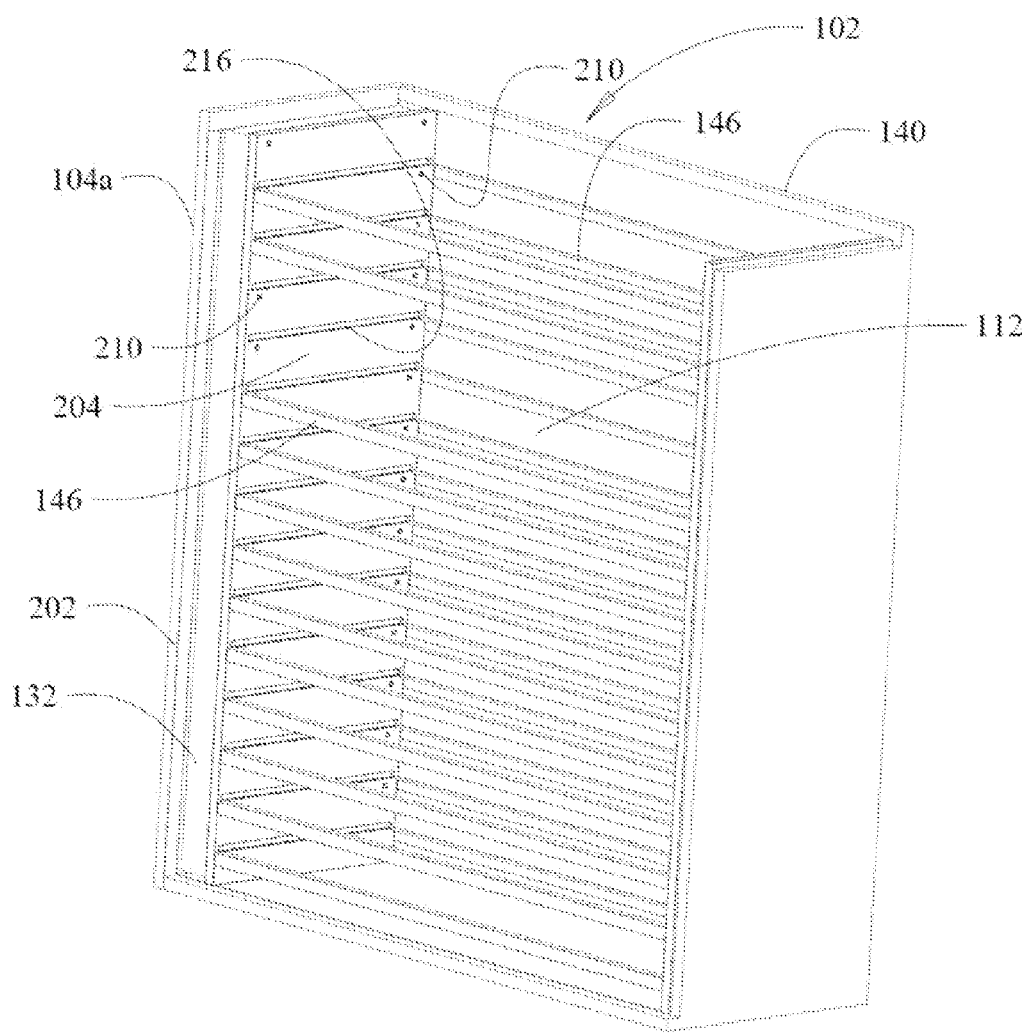
FIG. 2 is an isometric view of the case of the cart with one side and top shown in phantom to view the interior.

A first embodiment shown in FIG. 2 demonstrates the case shell 140 creating the cavity 112 with the case shell top 143 and side 142 shown in phantom to expose the interior. The first door 104a is shown with the rim 132 received within the cavity 112 through the aperture 114a in the end of the case 102. The door 104a, seen in side section in FIG. 3A, incorporates an outer plate 202 from which the rim 132 extends. The rim is inset from a periphery of the plate 202 to be closely received into the aperture 114a. An insulated sealing member 204 is secured against the rim 132 or in the periphery of the rim 132 supported by a relief. The insulating sealing member 204 may be a pliable foam such as Styrofoam or urethane which is resiliently compressible to at least a limited degree. As previously described and seen in FIG. 3A, the walls 141 and 142 of the case shell 140 incorporate support rails 146 to receive and support food storage drawers 206 or serving trays 207 (best seen in FIG. 3B) in the cavity 112. Drawers 206 and food trays 207 are referred to jointly herein as "dividers".

The housing 134 in the door 104a contains multiple cooling pucks 208 which are supported between the outer plate 202 and insulating sealing member 204, as will be described in greater detail subsequently, to create a source of chilled gas in the housing 134. The cooling pucks 208 may be dry ice pucks of standard size, nominally 5 inch diameter with 1 inch thickness. In one embodiment, the insulating sealing member 204 is porous allowing convection through the material of the member. Alternatively or in addition, the insulating sealing member 204 incorporates multiple orifices 210 which allow convective flow of chilled gas from the door housing 134 into the cavity 112 of the case shell 140. Sizing of the orifices 210 may be predetermined to provide a specific convective cooling capacity based on flight duration, puck material and number/configuration of pucks loaded in the door housing 112. In example embodiments capable of providing cooling for multiple cooling chambers 212 with serving trays 206 on each set of support rails 146, an array of orifices as shown in the drawings having diameters of about 0.02 inch to 0.0312 inch yielding a total open area of between 0.005 square inches and 0.012 square inches for two orifices provide appropriate cooling gas flow for each compartment at desired sublimation rates of the cooling pucks in the insulated door compartment. Total area of the orifices may be divided between multiple orifices to improve gas flow distribution.

Figure 3A:
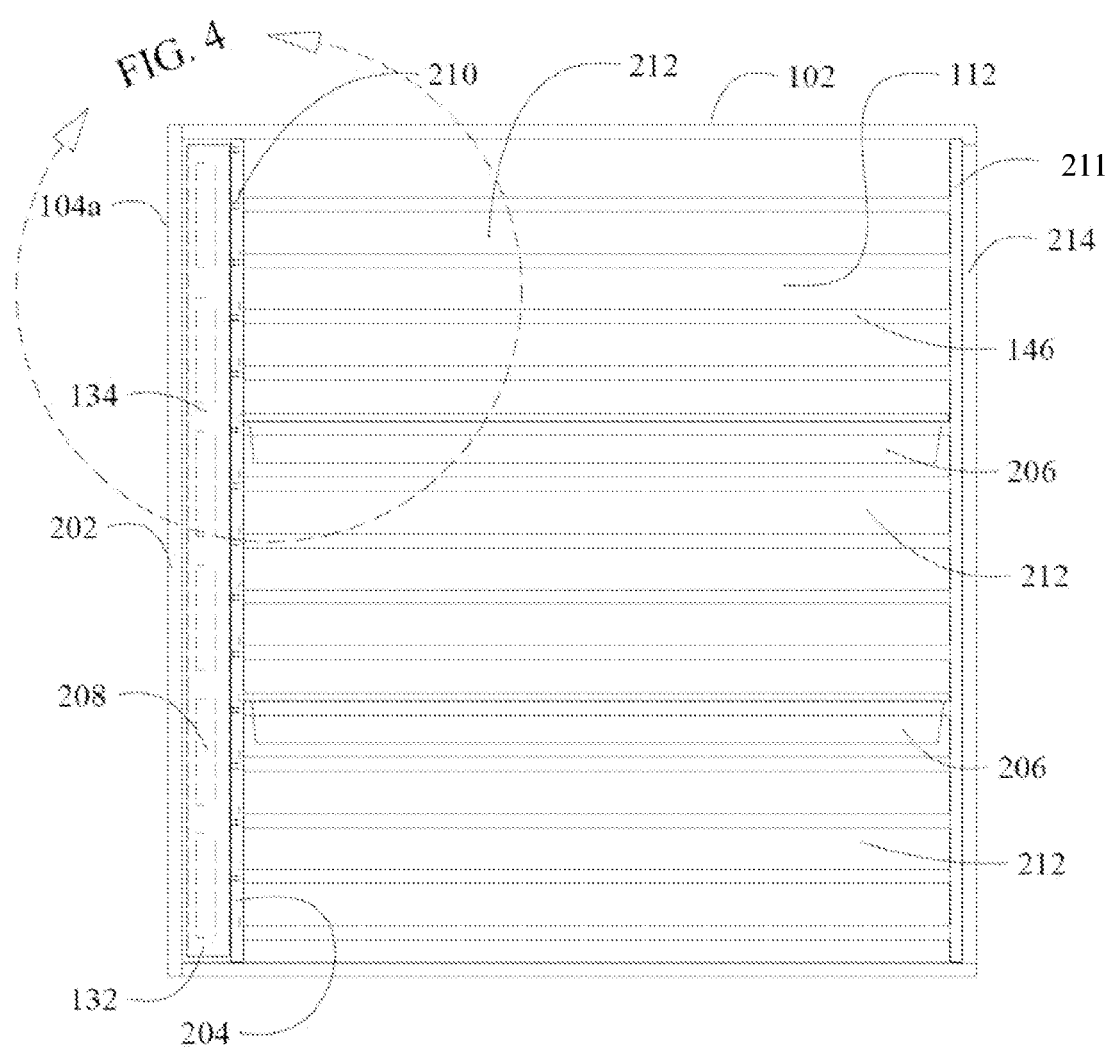
FIG. 3A is a side section view of the case.
Figure 3B:
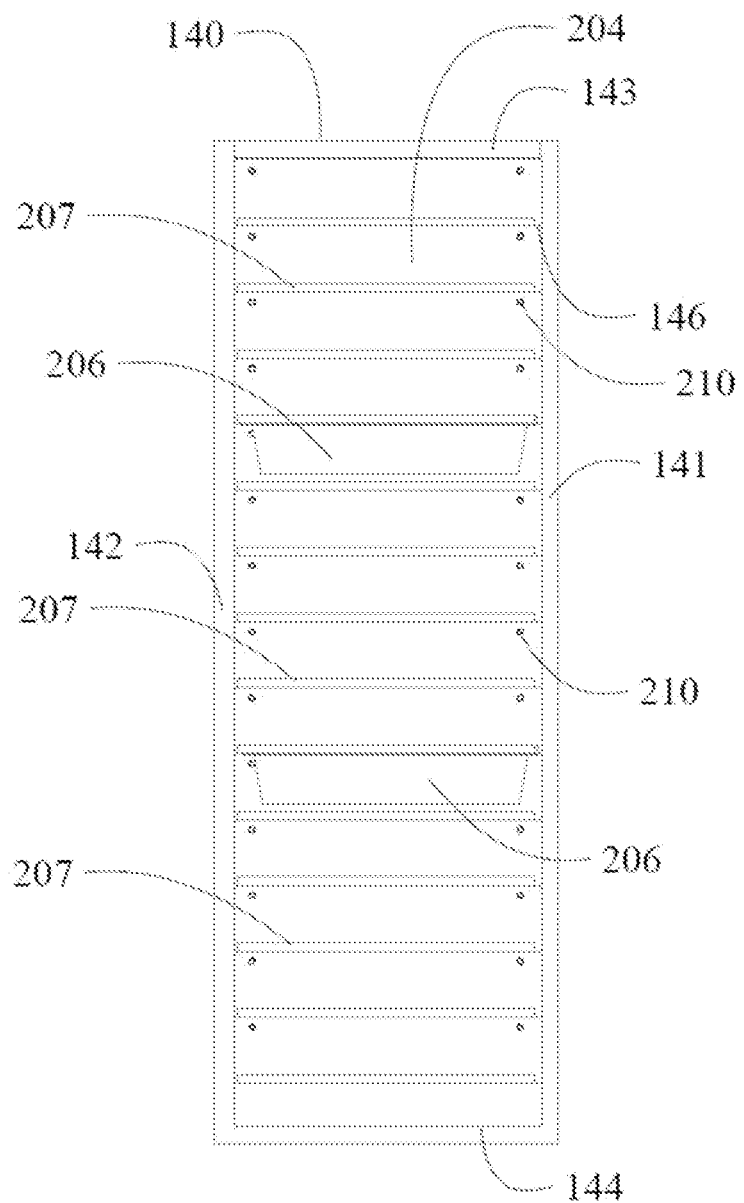
FIG. 3B is an end section view of the case.

As seen in FIGS. 3A and 3B, the food drawers 206 and serving trays 207 are sized to be closely received at a first end against the insulating sealing member 204 and closely received at an opposite end against a second insulating sealing member 211, slightly compressing the insulating sealing members to act as dividers creating multiple sealed chambers 212 within the cavity 112. The availability of multiple chambers allows selection of the number and placement of cooling pucks in the door housing 134. All chambers may be cooled or only selected chambers. For the embodiment show in FIG. 3A, the second insulating sealing member is supported against an end wall 214. However, a second door 104b, as shown in FIG. 1B, configured in the same manner as door 114a described above may be employed closing the second aperture 114b. The insulating sealing members may include grooves or slots 216, as seen in FIG. 2, aligned with the support rails 146 to more closely engage the serving tray 206 or other divider As seen in FIGS. 2, 3A and 3B, the orifices 210 are placed substantially adjacent the support rails 146 in pairs at opposite edges of the door 104a for cooling of a chamber 212 associated with each pair of adjacent trays 207. However, additional orifices or a single centrally located orifice may be employed in alternative embodiments. The engagement of serving trays on each set of support rails 146 by the insulating sealing members allows as many cooling chambers to be created as there are trays in the cart.

Figure 4:
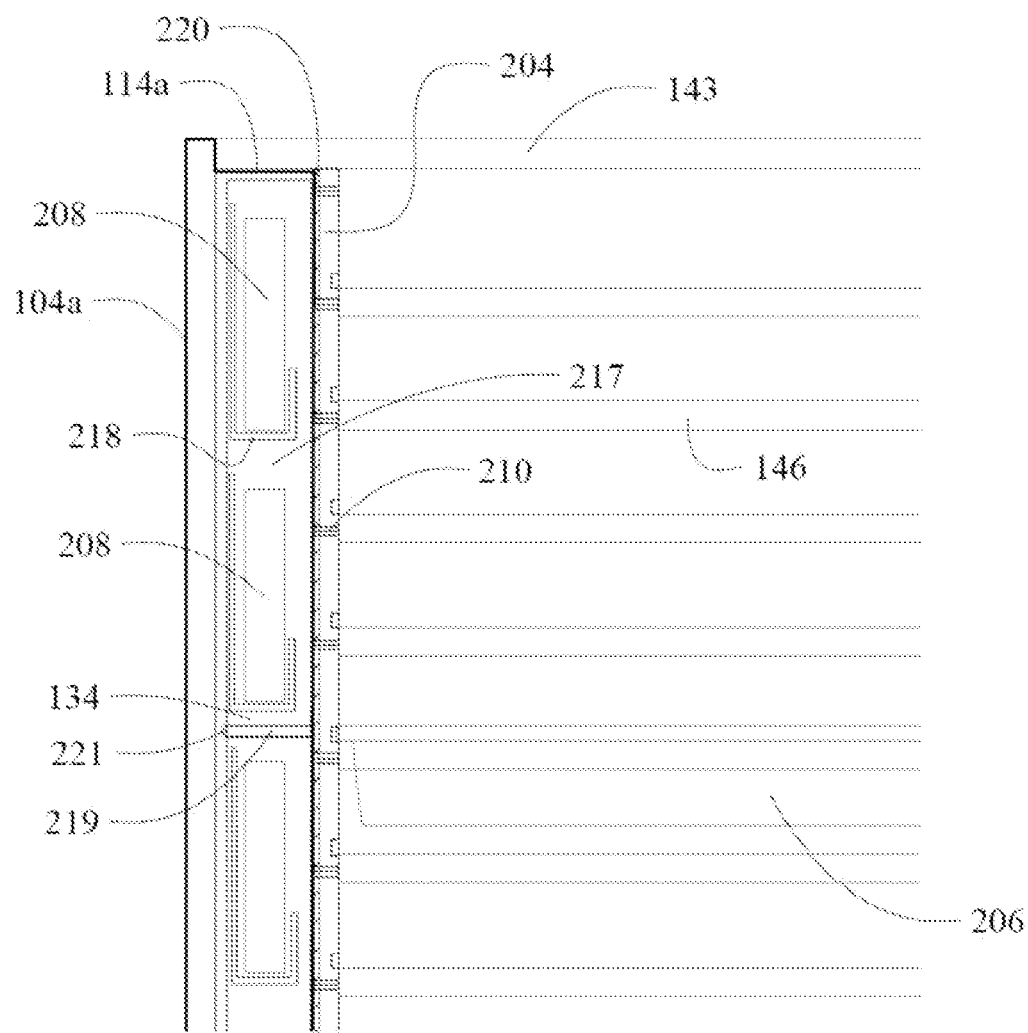
FIG. 4 is a detailed partial section view showing door details.

As seen in detail in FIG. 4, the door 104a provides the housing 134 to receive the cooling pucks 208. For the embodiment shown, baskets 218 support the cooling pucks in the housing 134. The baskets for the embodiment shown are a mesh or perforated thermally non-conductive material such as nylon or similar material. A simple L shape allows securing the baskets 218 to the inside surface of the door outer plate 202. In certain embodiments closing baskets may be employed to securely retain the pucks. For an example embodiment, the insulating sealing member 204 is attached to the door rim 132 using a hinge 220 allowing the insulating sealing member to pivot out of the cavity with the door 104a in the open condition to allow insertion of the pucks 208 into the baskets 218. Additionally, the housing may be segregated by partitions 219 into cooling compartments 217 to limit internal convection within the door housing thereby limiting stratification within the door housing itself. For the embodiment shown, the partitions 219 are placed in alignment with the divider serving trays 206 so the cooling compartments 217 in the door correspond to the cooling chambers 212 in the cavity 112 of the cart. The dividing walls 219 may be fixed or may be removably positioned in slots 221 in the rim 132 and door outer plate 202. The slots may be aligned to correspond with the support rails 146.

Figure 5:
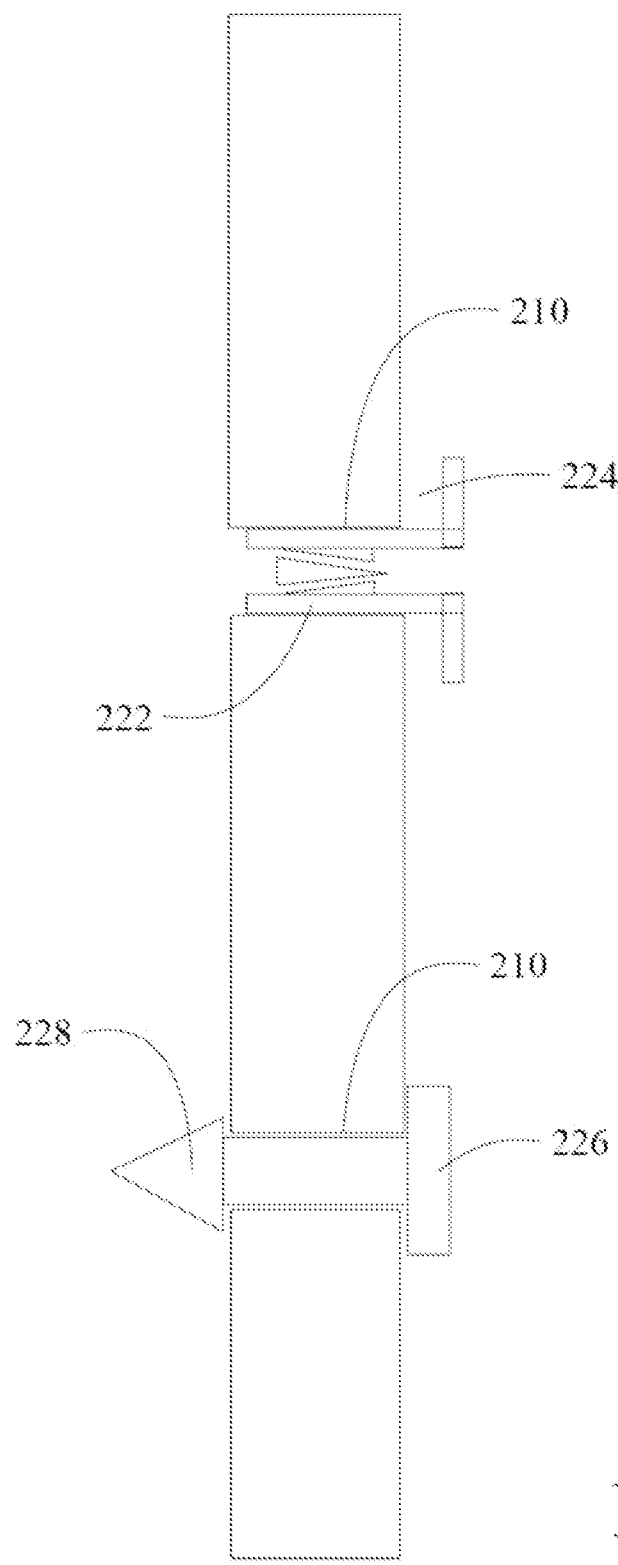
FIG. 5 is a side section view of embodiment of orifice adjustment devices.

Depending on the duration of the flight and the loading of the galley cart, it may be desirable to regulate convective flow of the chilled gas through the orifices 210. As shown in FIG. 5, an adjustable orifice fitting 222 may be inserted into the orifice and an adjustment nob 224 rotated to reduce the orifice area similar to a water hose nozzle. Alternatively, individual orifices may be blocked using a plug 226 which may be threaded to be received in mating threads in the orifice or provided with a resilient barbed fitting 228.

Figure 6:
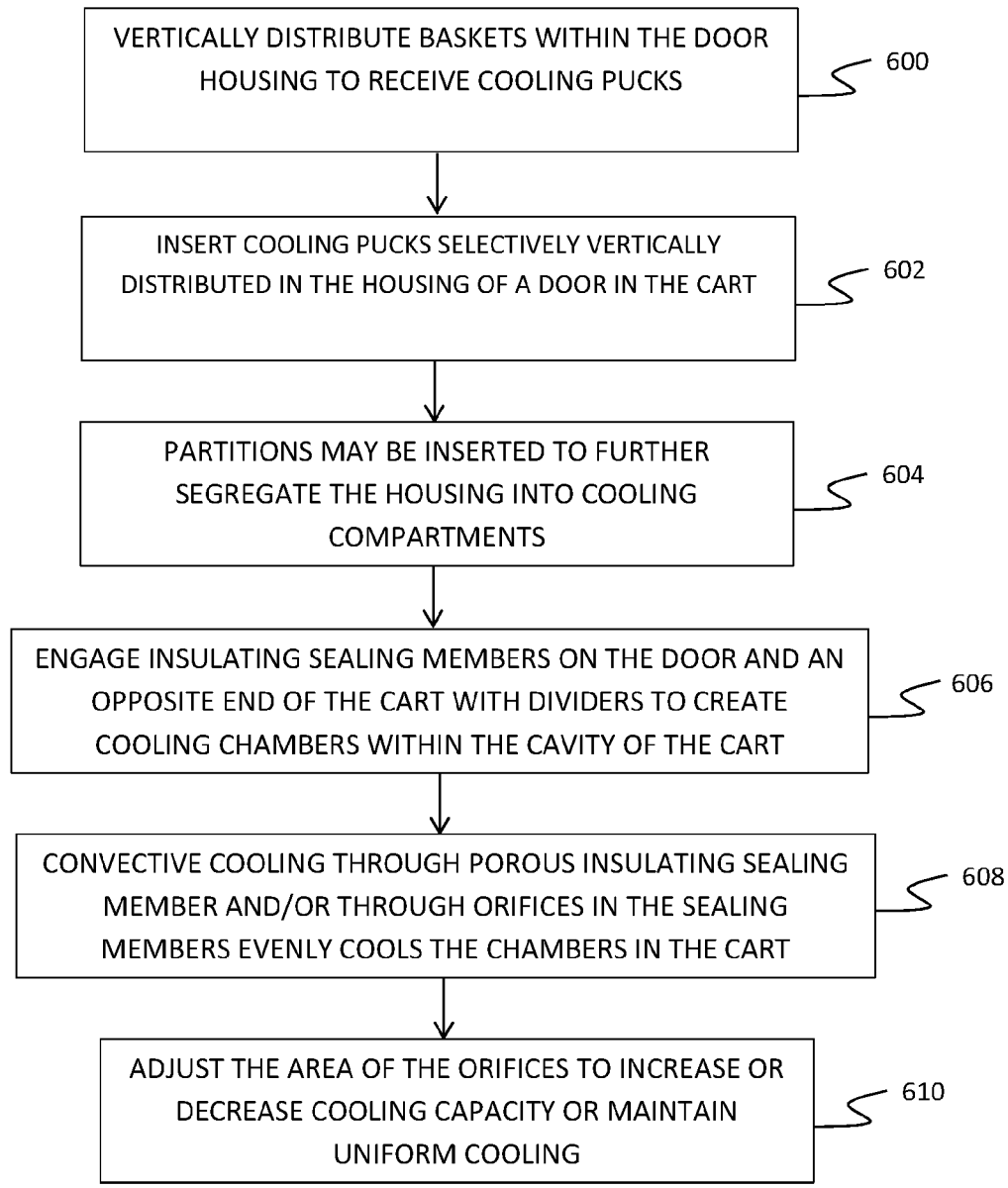
FIG. 6 is a flow chart of the method for cooling a galley cart provided by the disclosed embodiments.

The embodiments herein provide a method for cooling a galley cart as shown in FIG. 6. Baskets to receive cooling pucks are vertically distributed within the door housing, step 600. Cooling pucks are inserted selectively vertically distributed in the housing of a door in the cart, step 602. Partitions may be inserted to further segregate the housing into cooling compartments, step 604. Insulating sealing members on the door and an opposite end of the cart engage dividers to create cooling chambers within the cavity of the cart, step 606. Convective cooling through porous insulating sealing member and/or through orifices in the sealing members evenly cools the chambers in the cart, step 608. The area of the orifices may be adjusted to increase or decrease cooling capacity or maintain uniform cooling, step 610.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A cooling system comprising:
a case defining a cavity;
at least one upper and one lower divider positioned within the cavity, the at least one upper and one lower dividers each having a first end edge and an opposing second end edge, wherein the at least one upper and one lower dividers define at least one upper chamber and one lower chamber within the cavity;
a door movably attached to the case, the door having a first position in which the cavity is accessible and a second position in which the cavity is substantially sealed, the door comprising:
a housing having at least one partition segregating the housing into cooling compartments corresponding to the one upper chamber and one lower chamber, each cooling compartment configured to receive at least one cooling puck; and
at least one sealing member coupled to the housing of the door, the at least one sealing member configured to compress against the first end edges of the at least two dividers to prevent flow communication between the at least one upper chamber and at least one lower chamber thereby preventing stratification of cooling gas in the cavity and said at least one sealing member adapted to provide flow communication between a first cooling compartment and the at least one upper chamber and between a second cooling compartment and the at least one lower chamber when the door is in the second position.

2. The cooling system as defined in claim 1 wherein the sealing member is foam.
3. The cooling system as defined in claim 1 wherein a wall of the case opposing the door includes a second sealing member that contacts the second end edges of the dividers.
4. The cooling system as defined in claim 1 wherein the door further comprises baskets vertically distributed in the door housing, the baskets configured to support the cooling pucks.
5. The cooling system as defined in claim 1 wherein the dividers are trays.
6. The cooling system as defined in claim 1 wherein the trays are removable from the cavity.
7. The cooling system as defined in claim 1 wherein the cooling pucks are in fluid communication with more than one cavity chamber.
8. The cooling system as defined in claim 1 wherein the cooling pucks contain dry ice.
9. The cooling system as defined in claim 1 wherein the door is hinged to the case.
10. The cooling system as defined in claim 1 wherein the at least one partition is removable to vary configuration of the cooling compartments.
11. The cooling system as defined in claim 1 wherein the door further comprises at least one orifice through the sealing member in each cooling compartment.
12. The cooling system as defined in claim 11 wherein the at least one orifice has an area of between 0.005 square inches and 0.012 square inches.
13. The cooling system as defined in claim 11 wherein an area of the at least one orifice can be adjusted.
14. The cooling system as defined in claim 4 wherein the baskets are formed from non-conductive material.
15. The cooling system as defined in claim 1 wherein the case is on casters.
16. The cooling system as defined in claim 13 further comprising an adjustable orifice fitting inserted into the orifice, said fitting having an adjustment knob rotatable to reduce the orifice area.
17. The cooling system as defined in claim 13 further comprising a plug adapted to be received in the orifice and selected from the set of a threaded plug to be received in mating threads in the orifice or a plug with a resilient barbed fitting engaged within the orifice.
18. A method for cooling a galley cart comprising:
inserting cooling pucks selectively vertically distributed in a housing of a door of a cart;
engaging dividers in the cart with insulating sealing members on the door and an opposite end of the cart to create cooling chambers within a cavity of the cart, said sealing members preventing fluid communication between the cooling chambers to prevent stratification;
inserting partitions to segregate the door housing into cooling compartments corresponding to the cooling chambers; and,
cooling convectively through the insulating sealing member, if porous, or through orifices in the sealing members to evenly cool the chambers in the cart.
19. The method of claim 18 further comprising vertically distributing baskets to receive cooling pucks within the door housing.
20. The method of claim 18 further comprising adjusting an area of the orifices to increase or decrease cooling capacity and ensure uniform temperature.

* * * * *